United States Patent
Ninomiya

(10) Patent No.: US 7,304,929 B2
(45) Date of Patent: Dec. 4, 2007

(54) OPTICAL INFORMATION RECORDING MEDIUM, AN OPTICAL INFORMATION RECORDING APPARATUS, AN INFORMATION PROCESSING APPARATUS, PROGRAM AND INFORMATION RECORDING METHOD

(75) Inventor: Masaki Ninomiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 362 days.

(21) Appl. No.: 10/933,229

(22) Filed: Sep. 3, 2004

(65) Prior Publication Data

US 2005/0030862 A1  Feb. 10, 2005

Related U.S. Application Data

(63) Continuation of application No. PCT/JP2004/003938, filed on Mar. 23, 2004.

(30) Foreign Application Priority Data

Mar. 24, 2003 (JP) ............... 2003-080826
Feb. 3, 2004 (JP) ............... 2004-026683

(51) Int. Cl.
*G11B 5/09* (2006.01)
(52) U.S. Cl. ............... 369/47.53; 369/47.52; 369/116
(58) Field of Classification Search ............ 369/47.53, 369/47.22, 47.51, 94, 30.18, 53.21, 53.11, 369/59.1, 275.3, 47.14, 53.15, 53.17, 53.26, 369/53.2, 116, 47.52
See application file for complete search history.

(56) References Cited

U.S. PATENT DOCUMENTS 5,309,419 A * 5/1994 Koike .................. 369/47.53
6,052,347 A * 4/2000 Miyata ................. 369/47.53
6,628,591 B1 * 9/2003 Yokota et al. ........... 369/53.21
6,735,153 B2 * 5/2004 Yoshida ................ 369/30.18
6,738,329 B2 * 5/2004 Hsiao .................. 369/47.53
6,845,071 B2 * 1/2005 Shoji et al. ............. 369/47.53
6,850,469 B2 * 2/2005 Ogawa et al. ........... 369/47.22
6,894,962 B1 * 5/2005 Nishiuchi et al. ........ 369/47.51
7,184,377 B2 * 2/2007 Ito et al. ............... 369/47.14

(Continued)

FOREIGN PATENT DOCUMENTS

JP  11-3550  1/1999

(Continued)

*Primary Examiner*—Andrea Wellington
*Assistant Examiner*—Kim-Kwok Chu
(74) *Attorney, Agent, or Firm*—Dickstein Shapiro LLP

(57) ABSTRACT

An optical information recording apparatus can maintain a stable recording quality when recording information on an optical information recording medium having a recording layer of a multilayer structure. An optical information recording medium of a rotating type has a plurality of recording layers each having an information recording area in which information is recorded using a laser beam. An inner power calibration area is provided in each of the recording layers at a location closer to a center of rotation of the optical information recording medium than the information recording area, and is used to perform a test write in an optimum power control process to acquire an optimum recording power of the laser beam. The outer power calibration area is provided at a location farther from the center of rotation than the information recording area, and is used to perform a test write in an optimum power control process to acquire an optimum recording power of the laser beam.

4 Claims, 7 Drawing Sheets

U.S. PATENT DOCUMENTS

| | | |
|---|---|---|
| 2002/0136122 A1 | 9/2002 | Nakano |
| 2004/0085868 A1 | 5/2004 | Ohno et al. |
| 2004/0100894 A1 | 5/2004 | Ninomiya et al. |

FOREIGN PATENT DOCUMENTS

| | | |
|---|---|---|
| JP | 2000-311346 | 11/2000 |
| JP | 2001-52337 | 2/2001 |
| JP | 2003-22532 | 1/2003 |
| JP | 2003-30842 | 1/2003 |
| JP | 2003-91820 | 3/2003 |
| JP | 2003-168216 | 6/2003 |
| WO | WO 2004/086394 A1 | 7/2004 |

* cited by examiner (a) APPROPRIATE POWER
(b) EXCESSIVE POWER
(c) INSUFFICIENT POWER

OPTICAL INFORMATION RECORDING MEDIUM, AN OPTICAL INFORMATION RECORDING APPARATUS, AN INFORMATION PROCESSING APPARATUS, PROGRAM AND INFORMATION RECORDING METHOD

CROSS-REFERENCE TO RELATED APPLICATION

This application is a U.S. continuation application filed under 35 U.S.C. 111(a) claiming benefit under 35 U.S.C. 120 and 365(c) of PCT application JP2004/003938, filed Mar. 23, 2004.

BACKGROUND OF THE INVENTION

1. Field of the Invention

The present invention generally relates to information recording techniques and, more particularly, to an optical information recording technique for recording information on an optical information recording medium having a multi-layer recording layer that contains an information recording area.

2. Description of the Related Art

In recent years, with improvement in their functions, personal computers (hereinafter, may be abbreviated as PCs) have become capable of handling audio-visual (AV) information such as music information or image information. Since an amount of the AV information is extremely large, optical discs such as CD (Compact Disc) or DVD (Digital Versatile Disc) have attracted attention as an optical information recording medium. Then, a price-reduction of the optical discs such as CD or DVD has progressed, which results in that an optical disc drive unit as an optical information recording apparatus has become popular as one of peripheral devices of personal computers.

As a recording/reproducing method applicable to such an optical disc, there are known a constant linear velocity (CLV) method, a constant angular velocity (CAV) method and a zone CLV (ZCLV) method that combines the CLV method and the CAV method. According to the CLV method, an optical disc is rotated at a constant linear velocity, which gives little complexity to data management or rotation speed control since a rotation speed is constant and a linear velocity is increased as it goes to an outer side, but is capable of providing a large recording capacity. On the other hand, according to the CLV method, it is necessary to increase a rotation speed of an optical disc as a recording point goes inner side of the optical disc, which makes it difficult to rotate the optical disc at such a high speed. Moreover, an increase in the rotation speed of the optical disc may cause a problem of increasing motor cost, increasing sound and vibration or difficulty in servo system design.

In this regard, the CAV method rotates an optical disc at a constant angular velocity (rotation speed), which makes easy to manage data or control the rotation speed. However, a recording capacity achieved by the CAV method is smaller than that of the CLV method. Additionally, according to the ZCLV method, an optical disc is divided into a plurality of zones in a radial direction so that a linear velocity is constant within each zone. Then, a rotation speed is varied so that the linear velocity is increased as it goes to outer side of the optical disc. Therefore, the ZCLV method has the advantages of both the CLV method and the CAV method.

However, even if a recoding is performed according to the ZCLV method, when attempting a higher recording speed, there is a limitation in an output power of a semiconductor laser as a light source used in an optical disc drive unit. For this reason, for example, there may be a case in which a recording power necessary for achieving a desired recording characteristic exceeds a maximum output power of a semi-conductor laser when an insensitive optical disc is used.

Thus, usually, an optical disk drive unit performs a test write on an optical disc to record before starting recording on the optical disc. Then, the optical disk drive unit acquires an optimum recording power based on a reproduction signal characteristic obtained by reproducing information recording in a area where the test write was performed so as to perform the recording with the thus-obtained optimum recording power. Thereby, a good recording quality can be achieved. Hereinafter, the acquisition of the optimum recording power based on the reproduction signal obtained from the area where the test write is performed is referred to as an optimum power control (OPC). The area where the test write is performed when performing the OPC may be referred to as a power calibration area (PCA).

In recent years, a multi-layer optical disc having a recording layer containing a plurality of layers instead of single layer has been developed. As such a multilayer optical disc, there is known one which uses an organic dye material in addition to a reproduction only optical disc having multi-layered embossed pits. Since the organic dye material reacts with light irradiation and has transparency (high optical transmittance), the organic dye material is suitable for a material of the multilayer optical disc.

Japanese Laid-Open Patent Application No. 2003-22532 discloses an optical disc apparatus for performing recording or reproduction on such as multilayer optical disc.

In the meantime, there is a problem mentioned below when performing a recording on a multilayer optical disc having a recording layer containing a plurality of layers. For example, when recording information on a second recording layer of a two-layer disc having two recording layers on the same recording side, the recording of the second recording layer is performed by transmitting a light beam through the first recording layer. Therefore, an amount of the light beam reaching the second recording layer may be changed depending on a state of the first recording layer as to whether it is in a erased state (high reflectance, low transmittance) or a recorded state (low reflectance, high transmittance). Accordingly, there is a problem in that an optimum recording power acquired by OPC is changed due to changes in the amount of the light beam. Such a fluctuation in the optimum recording power may be a cause of degradation of recording characteristic such as a jitter or an error rate of the second recording layer.

SUMMARY OF THE INVENTION

It is a general object of the present invention to provide an improved and useful optical information recording apparatus in which the above-mentioned problems are eliminated.

A more specific object of the present invention is to provide an optical information recording apparatus which can maintain a stable recording quality when recording information on an optical information recording medium having a recording layer of a multilayer structure according to a constant linear velocity method.

Another object of the present invention is to provide an optical information recording apparatus which can maintain a stable recording quality when recording information on an optical information recording medium having a recording layer of a multilayer structure according to a constant angular velocity method.

In order to achieve the above-mentioned objects, there is provided according one aspect of the present invention an optical information recording medium of a rotating type having a plurality of recording layers each having an information recording area in which information is recorded using a laser beam, the optical information recording medium comprising: an inner power calibration area provided in each of the recording layers, the inner power calibration area being used to perform a test write in an optimum power control process to acquire an optimum recording power of the laser beam, the inner power calibration area located closer to a center of rotation of the optical information recording medium than the information recording area; and an outer power calibration area provided in each of the recording layers, the outer power calibration area being used to perform a test write in an optimum power control process to acquire an optimum recording power of the laser beam, the outer power calibration area located farther from the center of rotation than the information recording area.

According to the above-mentioned invention, the power calibration areas are provided on each of the inner side and the outer side with respect to the information recording area so that an optimum power calibration can be performed on both the inner side and the outer side of the recording layer onto which information is to be recorded, thereby enabling to acquire an optimum recording power corresponding to an intermediate linear velocity between linear velocities of the inner side and the outer side. Thus, even in a case where the linear velocity increases toward the outer periphery, an appropriate optimum recording power can be obtained.

Additionally, there is provided according to another aspect of the present invention an optical information recording apparatus for recording information on an optical information recording medium of a rotating type, which has a plurality of recording layers each having an information recording area in which information is recorded using a laser beam, according to a constant linear velocity method, the optical information recording apparatus comprising: optimum power control means for acquiring an optimum recording power of the laser beam with respect to the information recording area of each of the recording layers by performing a test write on a power calibration area provided in each of the recording layers; state determination means for determining whether the information recording area of a first one of the recording layers is in a recorded state or an erased state, the first one of the recording layers being located on a side where the laser beam is incident; and means for performing an optimum power calibration process on the power calibration area of a second one of the recording layers located under the first one of the recording layers after causing a state of the power calibration area of the first one of the recording layers to be equal to a state of the information recording area of the first one of the recording layers.

According to the above-mentioned invention, when recording information on an optical information recording medium having a recording layer of a multilayer structure according to a constant linear velocity, an appropriate optimum recording power can be acquired under a condition the same as that when performing information recording operation.

Additionally, there is provided according to another aspect of the present invention an optical information recording apparatus for recording information on an optical information recording medium of a rotating type, which has a plurality of recording layers each having an information recording area in which information is recorded using a laser beam, according to a constant angular velocity method, the optical information recording apparatus comprising: optimum power control means for setting an optimum recording power of the laser beam to a recording power corresponding to an intermediate linear velocity that is acquired by an interpolation method using a recording power determined by a test-write performed on an inner power calibration area and a recording area performed on an outer power calibration area, the inner power calibration area being closer to a center of rotation of the information recording medium than the information recording area, the outer power calibration area being farther from the center of rotation of the information recording medium than the information recording area; state determination means for determining whether the information recording area of a first one of the recording layers is in a recorded state or an erased state, the first one of the recording layers being located on a side where the laser beam is incident; and means for performing an optimum power calibration process on the inner-and outer power calibration areas of a second one of the recording layers located under the first one of the recording layers after causing a state of the inner and outer power calibration areas of the first one of the recording layers to be equal to a state of the information recording area of the first one of the recording layer.

According to the above-mentioned invention, when recording information on an optical information recording medium having a recording layer of a multilayer structure, an appropriate optimum recording power can be acquired by acquiring a recording power corresponding to an intermediate linear velocity that is determined using results of the optimum power calibration performed on the inner side and the outer side under a condition the same as that when performing information recording operation. Thus, even in a case where the linear velocity increases toward the outer periphery, an appropriate optimum recording power can be acquired.

Additionally, there is provided according to another aspect of the present invention an information processing apparatus for processing a plurality of kinds of information processing, comprising: processing means for processing the information processing using information provided by a memory apparatus; and one of the optical information recording apparatuses mentioned above.

Further, there is provided according to another aspect of the present invention an optical information recording method for recording information on an information recording medium of a rotating type, which has a plurality of recording layers each having an information recording area in which information is recorded using a laser beam, according to a constant linear velocity method, the optical information recording method comprising the steps of: acquiring an optimum recording power of the laser beam with respect to the information recording area of each of the recording layers by performing a test write on a power calibration area provided in each of the recording layers; determining whether the information recording area of a first one of the recording layers is in a recorded state or an erased state, the first one of the recording layers being located on a side where the laser beam is incident; and performing an optimum power calibration process on the power calibration area of a second one of the recording layers located under the first one of the recording layers after causing a state of the power calibration area of the first one of the recording layers to be equal to a state of the information recording area of the first one of the recording layers.

According to the above-mentioned invention, when recording information on an optical information recording medium having a recording layer of a multilayer structure according to a constant linear velocity, an appropriate optimum recording power can be acquired under a condition the same as that when performing information recording operation.

Additionally, there is provided according to another aspect of the present invention an optical information recording method for recording information on an optical information recording medium of a rotating type, which has a plurality of recording layers each having an information recording area in which information is recorded using a laser beam, according to a constant angular velocity method, the optical information recording method comprising the steps of: setting an optimum recording power of the laser beam to a recording power corresponding to an intermediate linear velocity that is acquired by an interpolation method using a recording power determined by a test write performed on an inner power calibration area and a recording area performed on an outer power calibration area, the inner power calibration area being closer to a center of rotation of the information recording medium than the information recording area, the outer power calibration area being farther from the center of rotation of the information recording medium than the information recording area; determining whether the information recording area of a first one of the recording layers is in a recorded state or an erased state, the first one of the recording layers being located on a side where the laser beam is incident; and performing an optimum power calibration process on the inner and outer power calibration areas of a second one of the recording layers located under the first one of the recording layers after causing a state of the inner and outer power calibration areas of the first one of the recording layers to be equal to a state of the information recording area of the first one of the recording layer.

According to the above-mentioned invention, when recording information on an optical information recording medium having a recording layer of a multilayer structure, an appropriate optimum recording power can be acquired by acquiring a recording power corresponding to an intermediate linear velocity that is determined using results of the optimum power calibration performed on the inner side and the outer side under a condition the same as that when performing information recording operation. Thus, even in a case where the linear velocity increases toward the outer periphery, an appropriate optimum recording power can be acquired.

Additionally, there is provided according to another aspect of the present invention a computer readable program to be installed in a computer of an information recording apparatus for recording information on an optical information recording medium of a rotating type, which has a plurality of recording layers each having an information recording area in which information is recorded using a laser beam, the program causing the computer to perform one of the above-mentioned optical information recording method.

Further, there is provided according to another aspect of the present invention a processor readable medium storing the above-mentioned program to be installed in a computer of an optical information recording apparatus for recording information on an optical information recording medium of a rotating type, which has a plurality of recording layers each having an information recording area in which information is recorded using a laser beam.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to FIG. 1 through FIG. 5, of a first embodiment of the present invention.

An optical information recording apparatus according to the first embodiment of the present invention records information on an optical disc, which is a multilayer optical disc having two record layers as a recordable rotation-type optical information recording medium.

Figure 1:
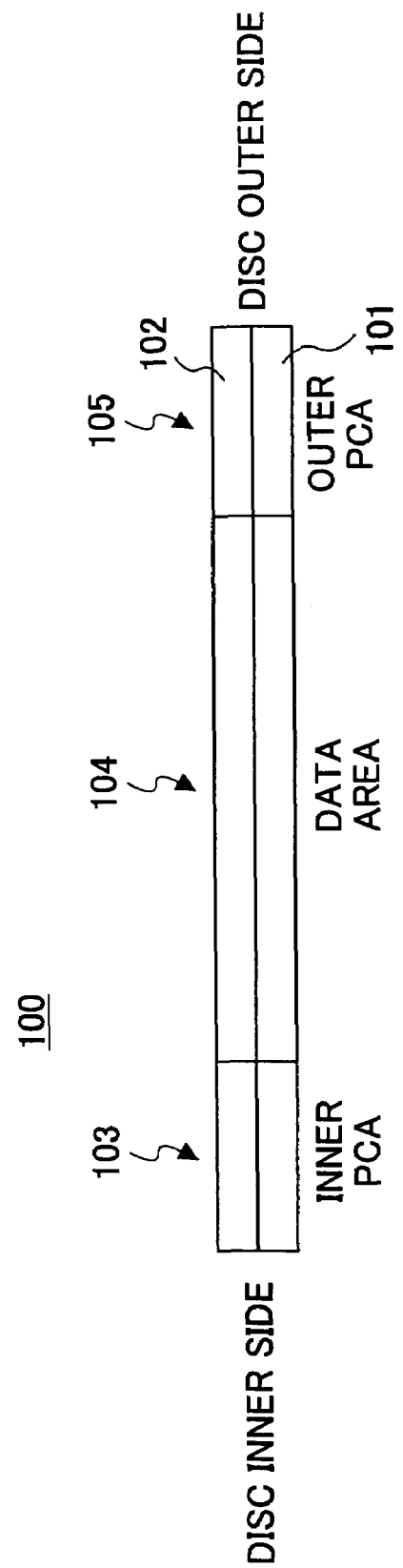
FIG. 1 is an illustration showing an area structure of an optical disc according to a first embodiment of the present invention.

FIG. 1 is an illustration showing an area structure of an optical disc 100 according to the first embodiment of the present invention. As shown in FIG. 1, the optical disc 100 has a two-layer structure, which comprises a recording layer (first layer) 101 located on a side of an optical pickup 5 (refer to FIG. 2) mentioned later and a recording layer (second layer) 102. The optical disc 100 is a dye-type medium which uses an organic color dye material. FIG. 1 shows a cross-sectional view of the optical disc 100 taken along a radial direction. The optical disc 100 has an inner PCA 103, an information recording area 104 and an outer PCA 105. The inner PCA 103 is provided an inner side of the information recording area 104 so that a test write is performed during an OPC process. The outer PCA 105 is provided an outer side of the information recording area 104 so that a test write is performed during an OPC process. That is, the optical disc 100 according to the present embodiment has PCAs, which permit a test write during an OPC, on an inner side closer to a center of rotation than the information recording area 104 and an outer side farther from the center of rotation than the information recording area 104 in a two-layer structure.

Figure 2:
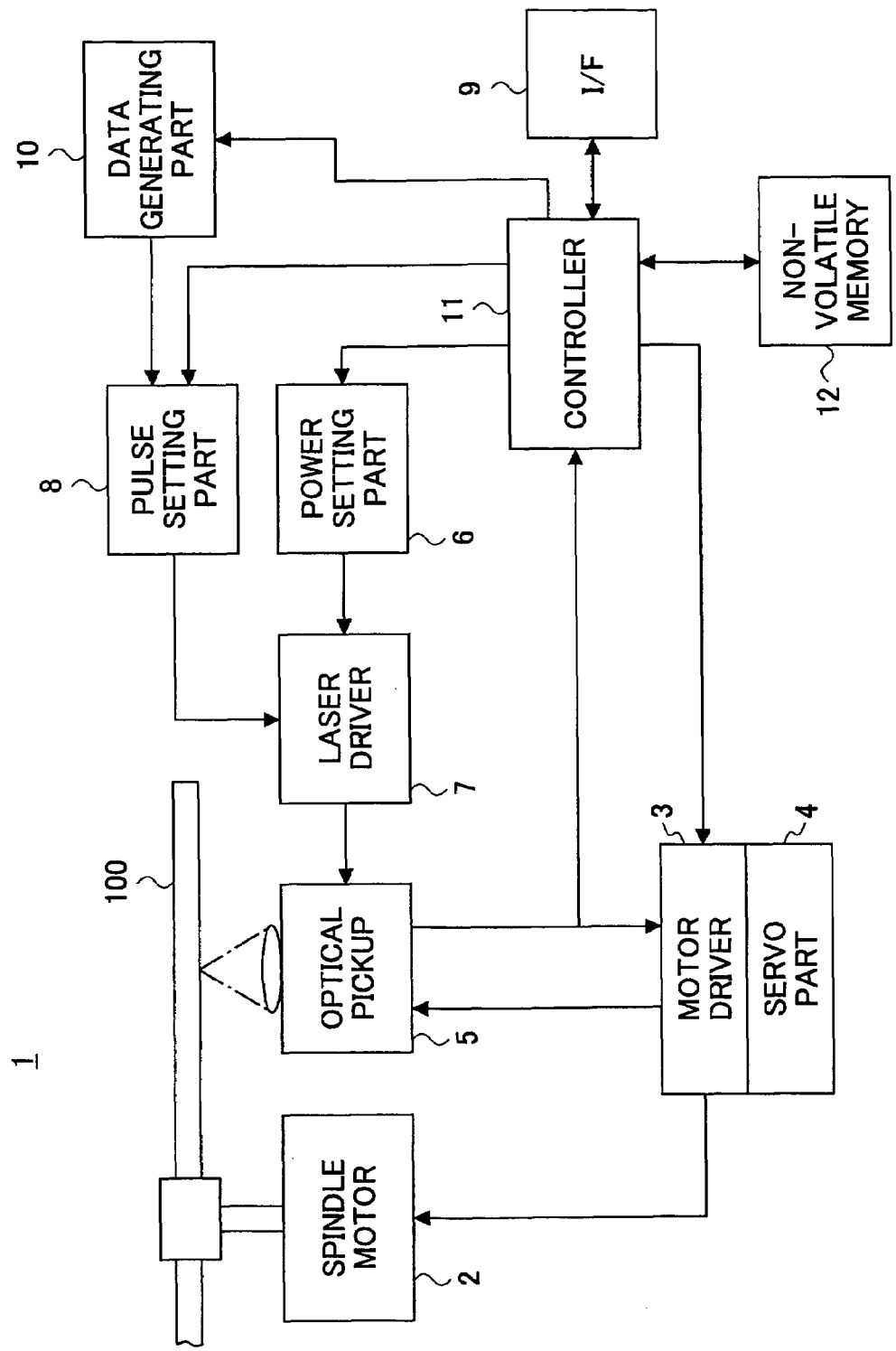
FIG. 2 is a block diagram of an optical disc drive unit according to the first embodiment of the present invention.

FIG. 2 is a block diagram showing a structure of an optical disc drive apparatus 1, which records or reproduces information on or from the optical disc 100. As shown in FIG. 2, the optical disc drive apparatus 1 rotates the optical disc 100 by the a rotation drive mechanism including a spindle motor 2. The spindle motor 2 is controlled to rotate at a constant angular velocity (rotation speed) by a motor driver 3 and a servo part 4 so that a write operation can be performed according to the CAV method or the ZCLV method.

An optical pickup 5 is equipped with a semiconductor laser as a light source, an optical system, a focusing actuator, a tracking actuator, light-receiving actuator, a position sensor, etc. so as to project a laser beam onto a recording surface of the optical disc 100. The optical pickup 5 is movable in a radial direction of the disc) by a seek motor (not shown in the figure). The focusing actuator, the tracking actuator and the seek motor are controlled by the motor driver 3 and the servo part 4 in accordance with signals acquired from the light-receiving element and the a position sensor so that a laser spot is located at a desired target position on the optical disc 100.

A power setting part 6 drives a laser driver 7 in accordance with a set recording power so as to drive the semiconductor laser of the optical pickup 5. The semiconductor laser of the optical pickup 5 is modulated between the recording power and a space power in accordance with a pulse signal input to the laser driver 7. Thereby, record marks and parts other than the record marks are formed on the recording layers of the optical disc 100.

It should be noted that although the pulse width set by the laser driver 7 may be fixed, the pulse width is set by the pulse setting part 8 in accordance with a linear velocity and a disc type in the present embodiment. The reason for setting the pulse width in accordance with a linear velocity and a disc type is to absorb a difference in sensitivity of a record mark length due to variation in the linear velocity and disc type. A disc type can be detected from a reproduction signal generated when information recorded in a specific area of the optical disc by the optical pickup 5. If, for example, disc manufacturers can be discriminated according to a certain method, the disc type may be classified according to each manufacture. It is better if the classification can be made further in detail within the same manufacture's discs. More specifically, a specific manufacturer discrimination cord (vender cord) may be embedded in the optical disc 100 beforehand. Furthermore, a code for classification in further detail may be embedded in the optical disc 100. As anther method for discriminating disc types, various parameters embedded in the optical disc 100 may be used. If, for example, a recommended power or pulse width is embedded, such information may be used. Thus, an optimum pulse width setting (write strategy) can be achieved in response to various optical discs of the same manufacture.

When recording data, upon receipt of data transferred from a host (not shown) through an interface (I/F) 9 such as ATAPI or SCSI, a data generating part 10 applies to the data an encoding process or a modulating process in a predetermined format, and outputs the data as recording data in a serial format to the laser driver 7 through the pulse setting part 8.

The optical disc drive apparatus 1 is equipped with a controller 11 for controlling each of the above-mentioned parts and also performing each function mentioned later. The controller 11 includes a microcomputer comprising a central processing unit (CPU) which controls each part, a read only memory (ROM) for storing fixed data such as a program executed by the CPU, a random access memory (RAM) for rewritably writing variable data such as work data, etc. A non-volatile memory 12 is connected to the controller 11.

Except for a case where an OPC result at the time of recording on the optical disc 100 recorded in the past is already stored in the non-volatile memory 12, the controller 11 of the optical disk drive apparatus 1 according to the present embodiment performs an OPC process in the PCA of the optical disc 100 so as to acquire an optimum recording power. The OPC means acquisition of an optimum recording power based on a reproduction signal from an area where a test write was performed. During execution of the OPC process, in the inner PCA 103 and the outer PCA 105, a test write for a predetermined number of blocks (for example, 10 blocks) corresponding to a predetermined number of times is performed while increasing the recording power of the semiconductor laser on an individual block basis (each step).

Figure 3:
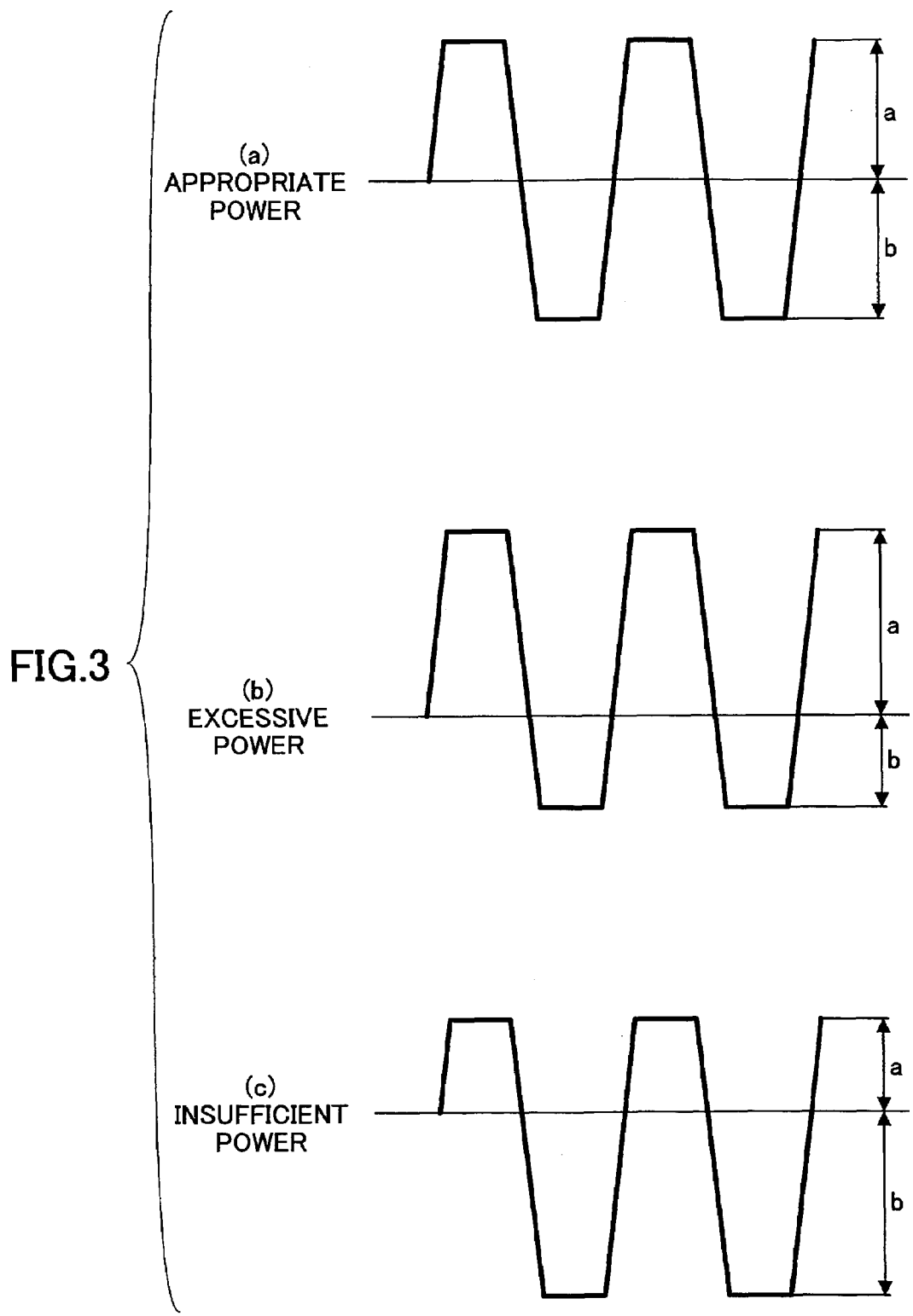
FIG. 3 is an illustration for explaining changes in a sate of a reproduction signal due to changes in a recording power.

When performing the OPC process, data in the test-written area is reproduced so as to acquire a reproduction signal RF, and an evaluation measurement value β is obtained from the reproduction signal RF. The value β corresponding to a symmetry of an amplitude when the reproduction signal RF is AC-coupled. That is, referring to if FIG. 3 showing a state of the reproduction signal RF according to a recording power, (a) indicates an appropriate power, (b) indicates an excessive power, and (c) indicates an insufficient power. The lower side of the reproduction signal waveform corresponds to a part which forms record marks. Since a mark is recorded longer when a power is in excess, the duty shifts to a large even if the duty at a normal time is 50%. If the AC-coupling is performed, the evaluation measurement value β is represented as follows, where "a" is an upper side amplitude and "b" is a lower side amplitude that are detected by a peak and bottom detecting circuit (not shown).

$$\beta=(a-b)/(a+b)$$

It can be appreciated from the example shown in FIG. 3 that β is substantially zero if a power is appropriate, β is increased if a power is in excess, and β is decreased if a power is insufficient. Thus, in OPC, an optimum recording power is obtained as a recording power at which the value of β is a target value βtarget (for example, 0.04).

It should be noted that during execution of the OPC process, the optical disc 100 is rotated at a constant angular velocity (rotation speed), and the test write is performed according to the CAV method or the ZCLV method. The optimum recording power is calculated according to the above-mentioned method, an instruction of the recording power is supplied to the laser driver 7.

Figure 4:
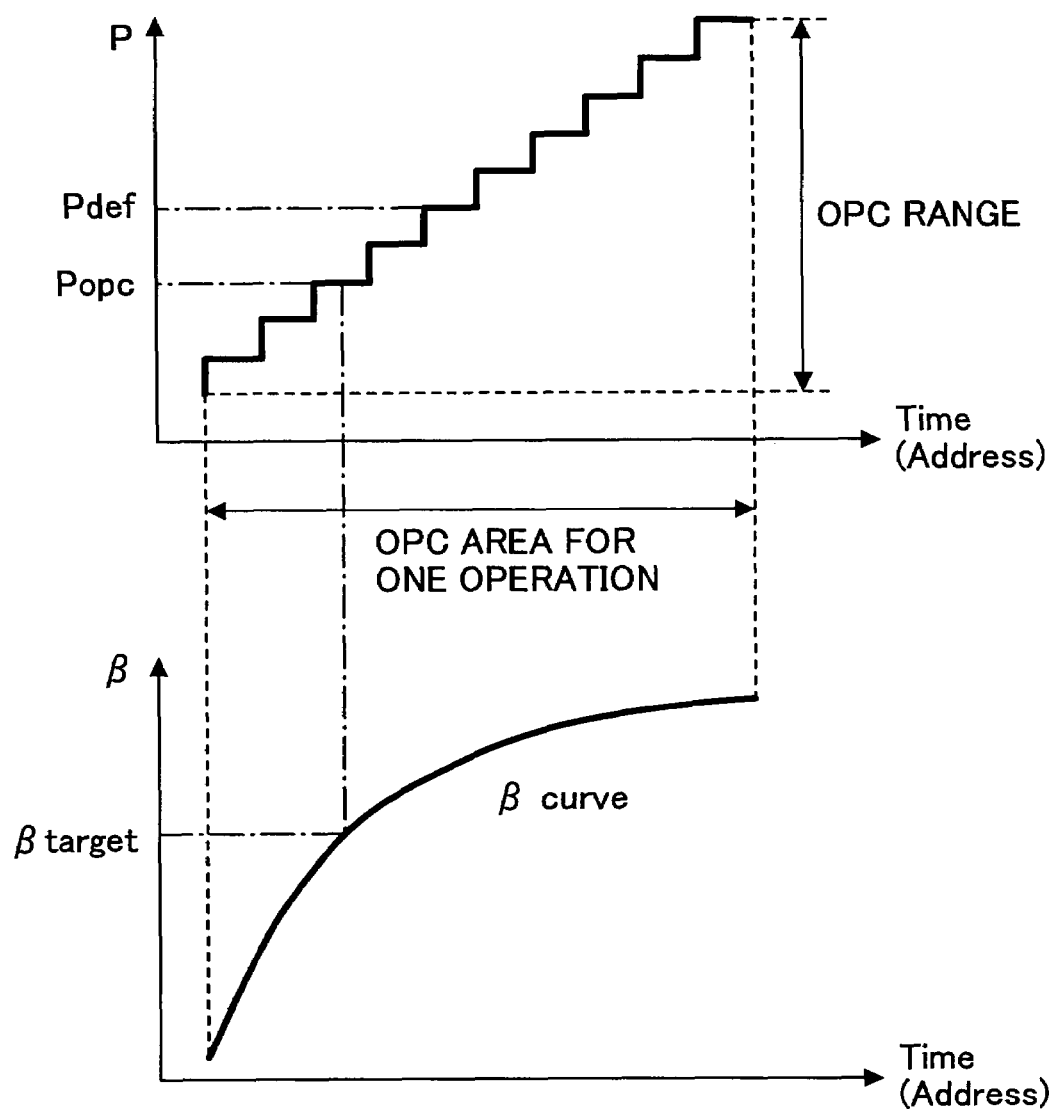
FIG. 4 is a graph showing a relationship between a recording power and an evaluation measurement value.

Here, a relationship between a recording power and the evaluation measurement value beta is shown in FIG. 4. FIG. 4 shows an example where a recording is performed while varying the power with 10 steps. A range of variation of the recording power is referred to as an OPC, and a central power of the range is represented by Pdef. The OPC range may be defined by varying within a range from +40% to −30% with respect to the Pdef with 10 steps, or may be varied with respect to the Pdef within a range from +5 mW to −4 mW by 1 mW.

A β-curve (quadratic) is approximated in accordance with the thus-obtained 10 β values so as to acquire a power Popc corresponding to the target value βtarget. It is better to obtain the Popc near the Pdef under a normal condition since the Popc may somewhat fluctuate due to a condition at the time of executing the OPC process, such as a change in temperature. Moreover, since the Popc differs from an optical disc to an optical disc in many cases, the Popc may be set together with a pulse width (write strategy) corresponding to a type of an optical disc.

Figure 5:
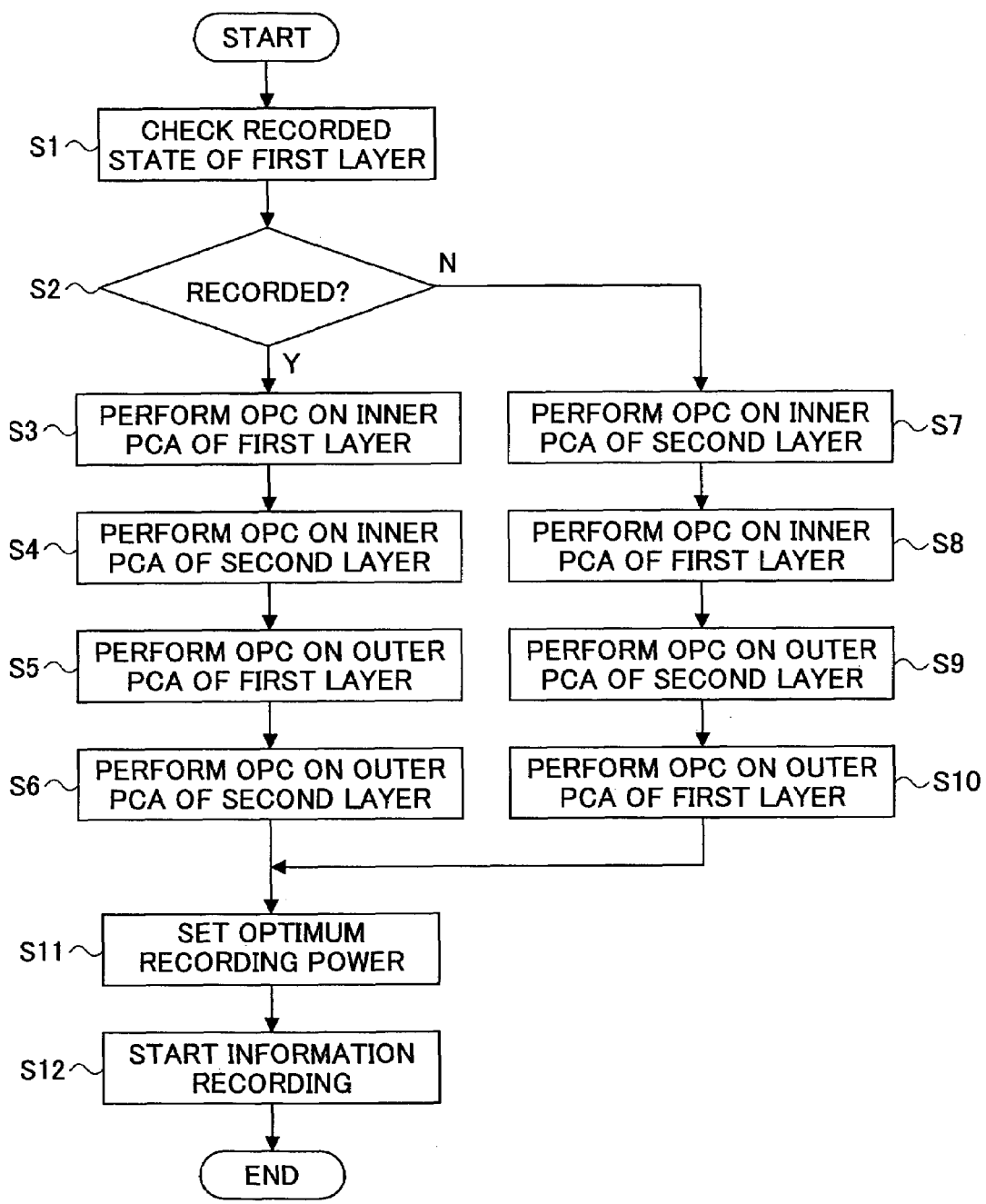
FIG. 5 is a flowchart of an OPC process.

A description will now be given, with reference to FIG. 5, of an OPC process in the above-mentioned controller 11. As shown in FIG. 5, before recording information on the optical disc 100, first, a recording state of the information recording area 104 of the recording layer (first layer) 101 of the optical disc 100 is checked using management information of the optical disc 100 (step S1). If the reproduction signal RF is used, the optical pickup 5 is moved to in a radial direction from inner side to an outer side so as to acquire the reproduction signal RF. Then, position information of the optical pickup 5 and information regarding presence of the reproduction signal RF are stored. When using the management information of the optical disc 100, data in the management information recording area (not shown) is reproduced, and it is checked to what extent the information is recorded.

After checking the recorded state of the information record area 104 of the recording layer (first layer) 101 of the optical disc 100 as mentioned above, an OPC is performed so as to acquire an optimum recording power. If information is recorded on the information record area 104 of the recording layer (first layer) 101 of the optical disc 100, (Y of step S2: state determination means), an OPC is performed on the inner PCA 103 of the recording layer (first layer) 101 of the optical disc 100 (step S3: OPC means). Thereafter, an OPC is performed on the inner PCA 103 of the recording layer (second layer) 102 of the optical disc 100 (step S4: OPC means). Subsequently, an OPC is performed on the outer PCA 105 of the recording layer (first layer) 101 of the optical disc 100 (step S5: OPC means), and, thereafter, an OPC is performed on the outer PCA 105 of the recording layer (second layer) 102 of the optical disc 100 (step S6: OPC means).

On the other hand, if information is not recorded on the information recording area 104 of the recording layer (first layer) 101 of the optical disc 100 (N of step S2: state determination means), an OPC is performed on the inner PCA 103 of the recording layer (second layer) 102 of the optical disc 100 (step S7: OPC means). Thereafter, an OPC is performed on the inner PCA 103 of the recording layer (first layer) 101 of the optical disc 100 (step S8: OPC means). Subsequently, an OPC is performed on the outer PCA 105 of the recording layer (second layer) 102 of the optical disc 100 (step S9: OPC means), and, thereafter, an OPC is performed on the outer PCA 105 of the recording layer (first layer) 101 of the optical disc 100 (step S10: OPC means).

The reason for performing an OPC to the inner PCA 103 and the outer PCA 105 of the optical disc 100, respectively, is as follows. As mentioned above, when performing an OPC, the optical disc 100 is rotated at a constant angular velocity (rotation speed), and a test write is performed according to the CAV method or the ZCLV method. If a recording is performed with a constant angular velocity (rotation speed), the linear velocity is increased as it goes toward an outer side. An increase in the linear velocity requires an increase in a recording power. Thus, in the present embodiment, an optimum recording power is acquired by performing an OPC on both an inner part and an outer part of the information recording area 104 of the optical disc 100.

Additionally, the reason for first performing the OPC on the recording layer (first layer) 101 of the optical disc 100, when information is recorded on the information recording area 104 of the recording layer (first layer) 101 of the optical disc 100, is as follows. That is, if information is recorded on the information recording area 104 of the recording layer (first layer) 101 of the optical disc 100, an OPC is performed on the PCA (the inner PCA 103 and the outer PCA 105) of the recording layer (second layer) 102 of the optical disc 100 in a state where information is written in the PCA (the inner PCA 103 and the outer PCA 105) of the recording layer (first layer) 101 of the optical disc 100 since the OPC is first performed on the recording layer (first layer) 101 of the optical disc 100. Thus, an optimum recording power is acquired in the same state where information is recorded on the information recording area 104 of the recording layer (first layer) 101 of the optical disc 100. Similarly, if information is not recorded on the information recording area 104 of the recording layer (first layer) 101 of the optical disc 100, the OPC is first performed on the recording layer (second layer) 102 of the optical disc 100 so that an optimum recording power is acquired in the same state where information is not recorded on the information recording area 104 of the recording layer (first layer) 101 of the optical disc 100. As mentioned above, an optimum recording power can be acquired in the same state where information is recorded on the recording area.

After the OPC on the inner PCA 103 and the outer PCA 105 of the optical disc 100 is completed as mentioned above, an optimum recording power is acquired by acquiring a recording power at an intermediate linear velocity according to an interpolation using a result of the OPC performed on the inner PCA 103 and the outer PCA 105. Then, the thus-acquired optimum recording power is set as the optimum recording power for the optical disc 100 (step S11), and informational recording is started (step S12). That is, the optimum recording power is acquired by acquiring a recording power at an intermediate linear velocity according to an interpolation using the results of the OPC performed on the inner PCA 103 and the outer PCA 105 under the same condition as the information recording operation when performing information recording according to a constant angular velocity method using the optical disc 100 having a recording layer of a multilayer structure. Therefore, even in a case where the linear velocity increases as it moves toward an outer periphery, the optimum recording power can be acquired. Thereby, when performing information recording according to a constant angular velocity method using an information recording medium having a recording layer of a multilayer structure, a stable recording quality can be maintained.

It should be noted that in a case where information is recorded on a part of the information record area 104 of the recording layer (first layer) 101 of the optical disc 100 and if information is to be recorded on information recording area 104 of the recording layer (second layer) 102 of the optical disc 100, the optimum recording power, which is acquired when the OPC is performed first on the recording layer (first layer) of the optical disc 100 and the optimum recording power, which is acquired when the OPC is performed first on the recording layer (second layer) of the optical disc 100, may be stored as parameters in the nonvolatile memory 12 so that the optimum recording power used can be switched in the middle of the information recording.

Figure 6:
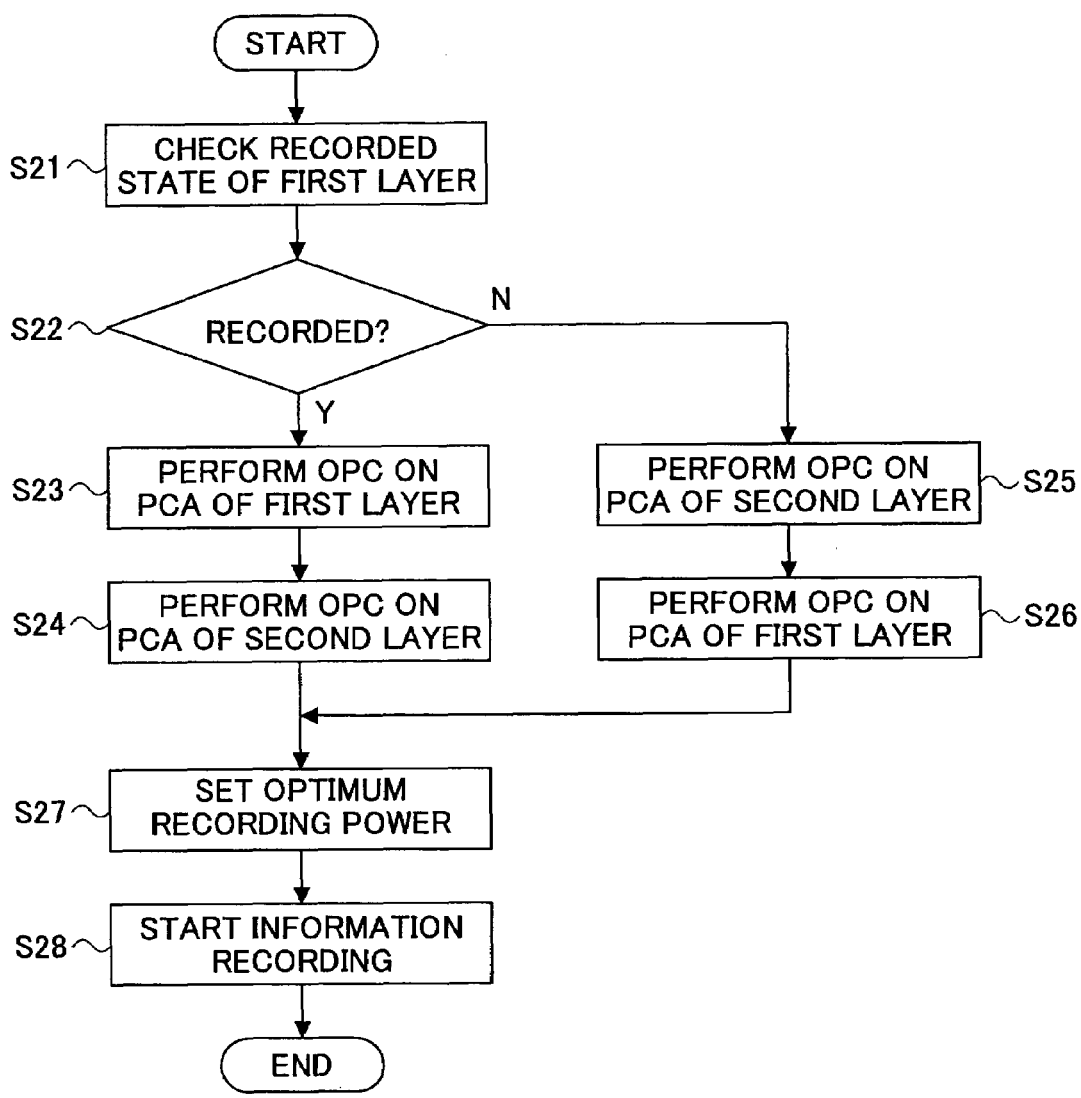
FIG. 6 is a flowchart of an OPC process according to a second embodiment of the present invention.

A description will now be given, with reference to FIG. 6, of a second embodiment of the present invention. An optical disc drive apparatus according to the second embodiment has basically the same structure as the optical disc drive apparatus according to the first embodiment. Thus, in the second embodiment, parts that are the same as the first embodiment are given the same reference numerals, and descriptions thereof will be omitted. Although the optical disc drive apparatus 1 according to the first embodiment uses the CAV method of the ZCAV method as the recording and reproducing method with respect to the optical disc 100, the optical disc drive apparatus 1 according to the second embodiment uses the CLV method as the recording and reproducing method with respect to the optical disc 100.

When the CLV method is used as the recording and reproducing method with respect to the optical disc 100, the optical disc 100 is rotated at a constant linear velocity, and a test write is performed according to the CLV method when performing an OPC. In such a case, since the relative velocity of the optical disc 100 and the laser beam from the semiconductor laser of the optical pickup 5 is always constant, it is not necessary to change the record conditions such as a recording power and a record pulse width over the whole surface of the optical disc if an optimum condition is once determined. For this reason, an OPC may be performed on either the inner PCA 103 or the outer PCA 105 of the optical disc 100, and information recording may be performed over the whole surface of the optical disc 100 at the same liner velocity using the thus-determined optimum recording power.

A description will now be given, with reference to a flowchart shown in FIG. 6, of the OPC process in the controller 11 according to the present embodiment. As shown in FIG. 6, first, a recorded state of the information recording area 104 of the recording layer (first layer) 101 of the optical disc 100 is checked using the reproduction signal RF or management information of the optical disc 100 (step S21). When using the reproduction signal RF, the optical pickup 5 is moved in a radial direction from an inner side to an outer side so as to acquire the reproduction signal RF, and the position information of the optical pickup 5 at this time and information regarding presence of the reproduction signal RF are stored. When using the management information of the optical disc 100, information recorded on the management information recording area (not shown) is reproduced and checks how far the information is recorded. After checking the recorded state of the information recording area 104 of the recording layer (first layer) 101 of the optical disc 100 as mentioned above, an OPC is performed so as to acquire an optimum recording power.

If information is recorded on the information record area 104 of the recording layer (first layer) 101 of the optical disc 100, (Y of step S22: state determination means), an OPC is performed on the inner PCA 103 (or the outer PCA 105) of the recording layer (first layer) 101 of the optical disc 100 (step S23: OPC means). Thereafter, an OPC is performed on the inner PCA 103 (or the outer PCA 105) of the recording layer (second layer) 102 of the optical disc 100 (step S24: OPC means).

On the other hand, if information is not recorded on the information recording area 104 of the recording-layer (first layer) 101 of the optical disc 100 (N of step S22: state determination means), an OPC is performed on the inner PCA 103 (or the outer PCA 105) of the recording layer (second layer) 102 of the optical disc 100 (step S25: OPC means). Thereafter, an OPC is performed on the inner PCA 103 (or the outer PCA 105) of the recording layer (first layer) 101 of the optical disc 100 (step S26: OPC means).

The reason for first performing the OPC on the recording layer (first layer) 101 of the optical disc 100, when information is recorded on the information recording area 104 of the recording layer (first layer) 101 of the optical disc 100, is as follows. That is, if information is recorded on the information recording area 104 of the recording layer (first layer) 101 of the optical disc 100, an OPC is performed on the inner PCA 103 (or the outer PCA 105) of the recording layer (second layer) 102 of the optical disc 100 in a state where information is written in the inner PCA 103 (or the outer PCA 105) of the recording layer (first layer) 101 of the optical disc 100 since the OPC is first performed on the recording layer (first layer) 101 of the optical disc 100. Thus, an optimum recording power is acquired in the same state where information is recorded on the information recording area 104 of the recording layer (first layer) 101 of the optical disc 100. Similarly, if information is not recorded on the information recording area 104 of the recording layer (first layer) 101 of the optical disc 100, the OPC is first performed on the recording layer (second layer) 102 of the optical disc 100 so that an optimum recording power is acquired in the same state where information is not recorded on the information recording area 104 of the recording layer (first layer) 101 of the optical disc 100. As mentioned above, an optimum recording power can be acquired in the same state where information is recorded on the recording area.

After the OPC on the inner PCA 103 (or the outer PCA 105) of the optical disc 100 is completed as mentioned above, the thus-acquired optimum recording power is set as the optimum recording power of the optical disc 100 (step S27), and information recording is started (step S28).

Here, when performing information recording according to the constant linear velocity using the optical disc 100 having a recording layer of a multilayer structure, an optimum recording power can be obtained under the same condition as that when performing an information recording operation. Thereby, a stable recording quality can be maintained when performing information recording according to the constant linear velocity using the optical disc 100 having a recording layer of a multilayer structure.

It should be noted that since a rotation speed must be increased as a recording point goes further inner side when the CLV method is used, it may become difficult to rotate the optical disc at such a high speed. Thus, a motor cost may be increased so as to provided a spindle motor that can achieve a higher rotation speed, and an increase in the rotation speed may increase noise and vibration. Additionally, it may become difficult to design the servo system. Thus, instead of limiting an increase in the rotation speed on the inner side, measures may be taken to limit a decrease in the rotation speed on the outer side. That is, in such a case, the linear velocity increases toward the outer side. Therefore, as explained in the first embodiment, a result of an OPC at the outer side and a result of an OPC at the inner side are acquired so as to set a recording power at an intermediate linear velocity as an optimum recording power of the optical disc 100.

A description will now be given, with reference to FIG. 7, of a third embodiment of the present invention. In the third embodiment, the present invention is applied to a desk-top type personal computer 50, which is equipped with the optical disc drive apparatus 1 such as explained in the above-mentioned embodiments in addition to a 3.5-inch flexible disc drive apparatus 51. The optical disc drive apparatus 1 may be integrally incorporated in the personal computer 50, or may be a built-in type. Accordingly, a host is also incorporated in the personal computer 50.

Since the above-mentioned optical disk drive apparatus 1 is built in the personal computer 50, the optical disk drive apparatus 1, which can acquire an optimum recording power in an OPC operation during a information recording operation according to the constant linear velocity method or the constant angular velocity method using the multilayer optical disc 100 having the two-layer recording layer, can be used as a memory apparatus of the personal computer 50.

It should be noted that the optical disc drive apparatus is not limited to be built in the personal computer 50 as in the present embodiment, and may be provided alone and connected to an information processing apparatus such as an external host apparatus. Moreover, the personal computer 50 is not limited to the desk-top type, and a portable type personal computer such as a notebook type computer may be used.

Figure 7:
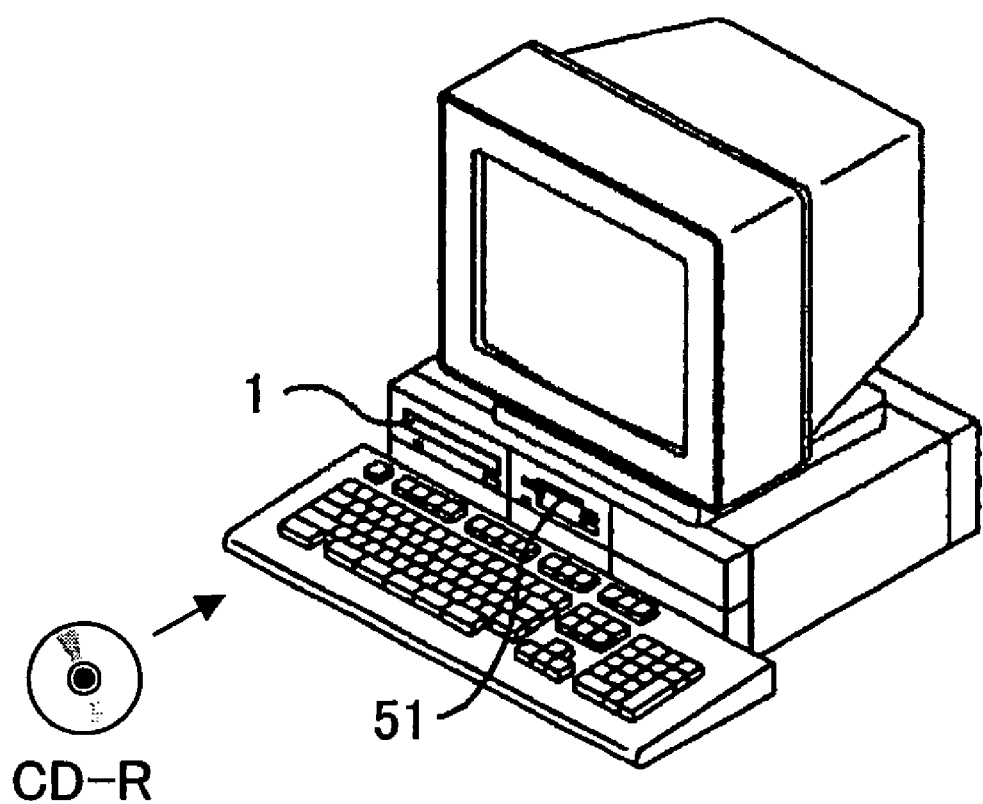
FIG. 7 is a perspective view of a personal computer according to a third embodiment of the present invention.

Additionally, a program that describes the above-mentioned optical information recording method may be stored in a processor readable medium such as a CD-R or a flexible disc so that the personal computer 50 can perform the function according to the information recording method by loading the processor readable medium to the personal computer 50 as shown in FIG. 7.

The present invention is not limited to the specifically disclosed embodiments, and variations and modifications may be made without departing from the scope of the present invention.

The present application is based on PCT application JP2004/003938, filed Mar. 23, 2004 and Japanese priority applications No. 2003-080826 filed Mar. 24, 2003 and No. 2004-026683 filed Feb. 3, 2004, the entire contents of which are hereby incorporated by reference.

What is claimed is:

1. An optical information recording method for recording information on an optical information recording medium of a rotating type, which has a plurality of recording layers each having an information recording area in which information is recorded using a laser beam according to a constant angular velocity method, said optical information recording method comprising:
    performing an optimum power control (OPC) on a first layer, subsequently on a second layer, so as to acquire a first optimum recording power;
    performing an OPC on the second layer, subsequently on the first layer, so as to acquire a second optimum recording power; and
    storing the acquired first and second optimum recording powers in a non-volatile memory,
    wherein the step of performing an OPC on a second layer, subsequently on a first layer, comprises:
        performing an OPC on an outer PCA of the second layer; and
        performing an OPC on an outer PCA of the first layer.

2. An optical information recording apparatus for recording information on an optical information recording medium of a rotating type, which has a plurality of recording layers each having an information recording area in which information is recorded using a laser beam according to a constant angular velocity method, said optical information recording apparatus comprising:
    a first optimum recording power obtaining circuit for performing an optimum power control (OPC) on a first layer, subsequently on a second layer, so as to acquire a first optimum recording power;
    a second optimum recording power obtaining circuit for performing an OPC on the second layer, subsequently on the first layer, so as to acquire a second optimum recording power; and
    a non-volatile memory for storing the acquired first and second optimum recording powers,
    wherein the performing an OPC on a second layer, subsequently on a first layer, comprises:
        performing an OPC on an outer PCA of the second layer; and
        performing an OPC on an outer PCA of the first layer.

3. An information processing apparatus for processing a plurality of kinds of information processing, comprising:
    an optimum power control (OPC) circuit for performing an OPC on a first layer, subsequently on a second layer, so as to acquire a first optimum recording power;
    a second optimum recording power obtaining circuit for performing an OPC on the second layer, subsequently on the first layer, so as to acquire a second optimum recording power; and
    a non-volatile memory for storing the acquired first and second optimum recording powers,
    wherein the performing an OPC on a second layer, subsequently on a first layer, comprises:
        performing an OPC on an outer PCA of the second layer; and
        performing an OPC on an outer PCA of the first layer.

4. A computer-readable medium storing a program to be installed in a computer of an information recording apparatus for recording information on an optical information recording medium of a rotating type, which has a plurality of recording layers each having an information recording area in which information is recorded using a laser beam according to a constant angular velocity method, said program causing said computer to perform functions of:
    performing an optimum power control (OPC) on a first layer, subsequently on a second layer, so as to acquire a first optimum recording power;
    performing an OPC on the second layer, subsequently on the first layer, so as to acquire a second optimum recording power; and
    storing the acquired first and second optimum recording powers in a non-volatile memory,
    wherein the performing an OPC on a second layer, subsequently on a first layer, comprises:
        performing an OPC on an outer PCA of the second layer; and
        performing an OPC on an outer PCA of the first layer.

* * * * *